Aug. 13, 1929.                M. FISCHER                1,724,649
                              MOTOR CAR
                           Filed April 16, 1928
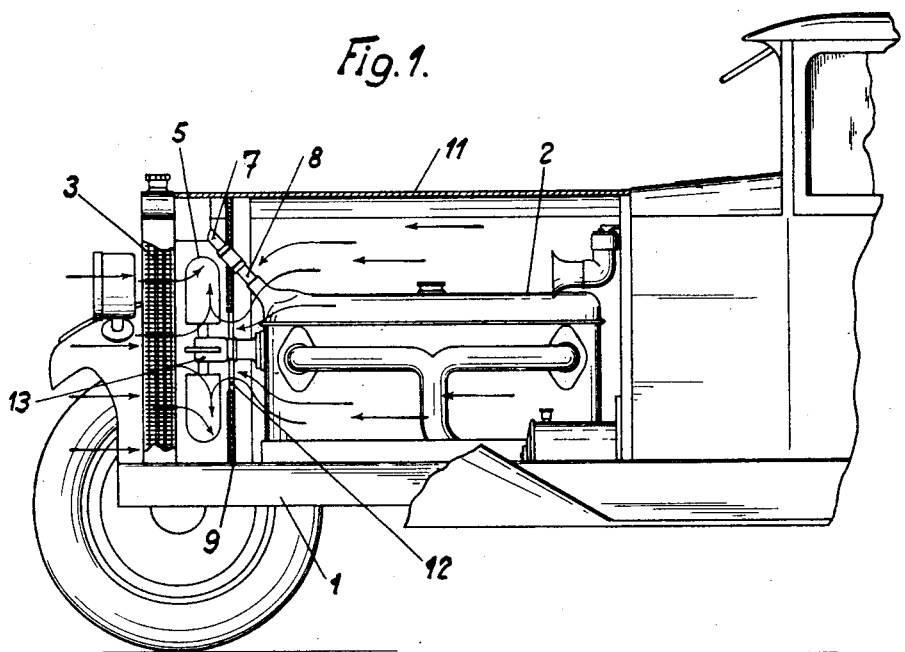
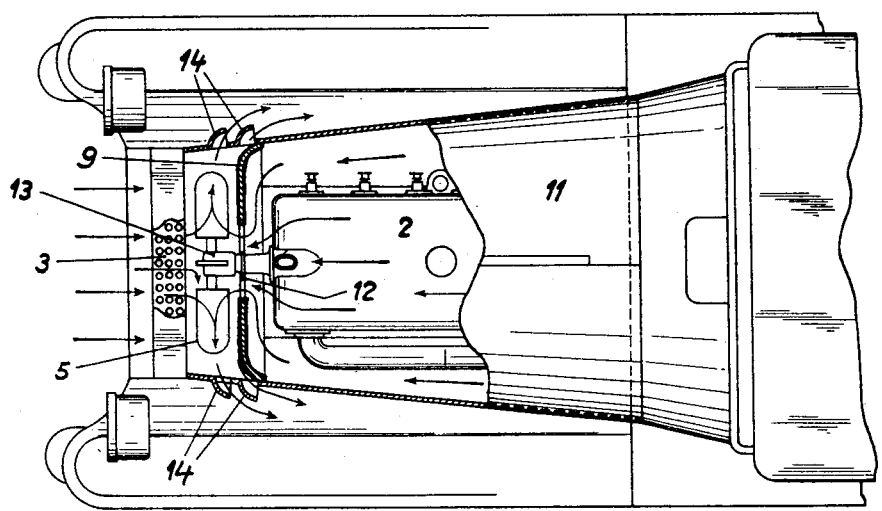

Patented Aug. 13, 1929.

1,724,649

UNITED STATES PATENT OFFICE.

MARTIN FISCHER, OF ZURICH, SWITZERLAND.

MOTOR CAR.

Application filed April 16, 1928, Serial No. 270,415, and in Germany August 10, 1927.

The invention relates to motor-cars having water-cooled engines, and more especially to motor cars having a cellular radiator through which air is drawn to cool the water.

The main object of the invention is to provide means to prevent the deposition of dust and mud on the engine and its working parts and to improve the cooling of the engine generally.

I attain these and other objects by the provision of means to deflect the air drawn in by the fan in such a manner that the air stream drawn in through the radiator cannot pass on to the engine and cannot deposit dust etc. on the working parts thereof. Moreover the fan draws off hot air from the engine and expels the same from beneath the hood.

In the accompanying drawing

Fig 1 is a side elevation of a motor car provided with the invention parts being shown in section;

Fig. 2 is a top view of the car, the hood and other parts being shown in section.

1 represents the wheeled chassis of the motor car, upon which the engine 2 is mounted in the usual manner. A cellular radiator 3 is located in front of the engine 2 and between the radiator 3 and the engine a fan or exhauster 5 is rotatably arranged in suitable bearings. The fan 5 is driven by suitable means for instance by belt and pulleys or in any other known manner. The fan 5 being located directly to the rear of the radiator sucks air through the cellular portion of the radiator to cool the water within said radiator. The water is conducted from the jacket of the engine to the radiator and back again by the usual pipes 7, 8.

9 is a partition located behind the fan 5 and in front of the engine 2. The partition 9 extends sidewardly and upwardly to the hood 11 shaped and mounted in the usual manner covering the engine and extending to the radiator 3. The partition 9 is provided with an aperture 12 through which the shaft 13 of the fan 5 passes. The hood 11 is provided with slots 14, the slots being arranged between the partition 9 and the radiator 3.

The fan 5 sucks air through the interstices of the radiator 3 and through the aperture 12 and projects the air through the slots 14. The air drawn by the fan through the radiator is prevented from passing on the engine 2 and its part and no dust or mud can reach the engine and its working parts. On the other hand fresh air is drawn over the engine and passes through the aperture 12. The air cools the engine.

The slots 14 may be done away with and the two air streams coming from the radiator and from the engine may be projected downwardly.

It will be obvious that changes in details of structure may be made within the scope of invention.

What I wish to secure by U. S. Letters Patent, is:—

In a motor car, a hood having air discharge openings, a radiator at a point in the hood in front of said openings, a partition in the hood at a point spaced from the radiator and in rear of said openings, said radiator having an opening, a motor in the hood at a point in rear of said partition so that the said opening in the partition establishes communication between the space in rear of the radiator and the motor space in the hood, and air propelling means in the space in rear of the radiator, all constructed and arranged to cause said air propelling means to suck air, vapor, gases and the like through the radiator and from the motor space into the space in the rear of the radiator and to force said air, vapor, gases and the like from said space out through the said openings in the hood.

In testimony whereof I affix my signature.

MARTIN FISCHER.